US009951195B2

(12) United States Patent
Riou

(10) Patent No.: US 9,951,195 B2
(45) Date of Patent: Apr. 24, 2018

(54) TIRE INNER LINER BASED ON BUTYL RUBBER COMPRISING A LOW CONTENT OF CARBON BLACK AND ANOTHER ADDITIONAL FILLER

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: Aline Riou, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 15/322,365

(22) PCT Filed: Jun. 30, 2015

(86) PCT No.: PCT/EP2015/064850
§ 371 (c)(1),
(2) Date: Dec. 27, 2016

(87) PCT Pub. No.: WO2016/001226
PCT Pub. Date: Jan. 7, 2016

(65) Prior Publication Data
US 2017/0137594 A1     May 18, 2017

(30) Foreign Application Priority Data

Jun. 30, 2014 (FR) .................................. 14 56155

(51) Int. Cl.
| | |
|---|---|
| C08K 3/00 | (2006.01) |
| C08K 3/04 | (2006.01) |
| C08K 3/26 | (2006.01) |
| C08L 23/28 | (2006.01) |

(52) U.S. Cl.
CPC .................. C08K 3/04 (2013.01); C08K 3/26 (2013.01); C08L 23/283 (2013.01); *C08K 2003/265* (2013.01)

(58) Field of Classification Search
CPC ...... C08K 3/04; C08K 3/26; C08K 2003/265; C08L 23/283
USPC ........................................................ 524/427
See application file for complete search history.

(56) References Cited

U.S. PATENT DOCUMENTS

| | | | |
|---|---|---|---|
| 3,470,127 A | 9/1969 | Snell et al. .................. 260/33.6 |
| 7,250,463 B2 | 7/2007 | Durel et al. .................. 524/492 |
| 7,491,765 B2 | 2/2009 | Krueger ........................ 524/451 |
| 7,649,043 B2 | 1/2010 | Bergman ...................... 524/445 |
| 8,088,861 B2 | 1/2012 | Joseph et al. ................. 524/526 |
| 8,304,471 B2 | 11/2012 | Joseph et al. ................. 523/157 |
| 8,304,482 B2 | 11/2012 | Joseph et al. ................. 524/492 |
| 2005/0004297 A1 | 1/2005 | Durel et al. .................. 524/493 |
| 2007/0161735 A1 | 7/2007 | Bergman ...................... 524/445 |
| 2008/0097021 A1 | 4/2008 | Krueger ........................ 524/451 |
| 2009/0159170 A1* | 6/2009 | Burkholder ........... B60C 1/0008 152/510 |
| 2010/0227968 A1* | 9/2010 | Joseph .................. B60C 1/0008 524/526 |
| 2010/0324200 A1* | 12/2010 | Joseph ....................... B60C 9/08 524/526 |
| 2011/0015303 A1 | 1/2011 | Joseph et al. ................. 523/157 |

FOREIGN PATENT DOCUMENTS

| | | |
|---|---|---|
| EP | 2 072 284 A2 | 6/2009 |
| FR | 1 485 387 | 6/1967 |
| FR | 2 925 061 A1 | 6/2009 |
| FR | 2 925 062 A1 | 6/2009 |
| GB | 1156196 A | 6/1969 |
| WO | 03/016387 A1 | 2/2003 |
| WO | 2006/047509 A2 | 5/2006 |
| WO | 2008/145314 A1 | 12/2008 |
| WO | 2013/060858 A1 | 5/2013 |

OTHER PUBLICATIONS

R. Mildenberg, et al., Hydrocarbon Resins, section 5.5 Rubber Tires and Mechanical Rubber Goods, VCH, New York (1997).

* cited by examiner

*Primary Examiner* — Hui H Chin
(74) *Attorney, Agent, or Firm* — Fitzpatrick, Cella, Harper & Scinto

(57) ABSTRACT

A tire inner liner comprises a rubber composition comprising: an elastomeric matrix comprising at least 50 phr of one or more butyl rubbers, from 5 to 35 phr of carbon black, from 0 to less than 10 phr of a plasticizing agent, at least 5 phr of one or more additional fillers selected from reinforcing fillers other than carbon black, semi-reinforcing fillers and inert fillers, the total content of reinforcing fillers and of semi-reinforcing fillers in the rubber composition varying from 5 to 50 phr. The invention also relates to a tire comprising such a liner.

21 Claims, No Drawings

TIRE INNER LINER BASED ON BUTYL RUBBER COMPRISING A LOW CONTENT OF CARBON BLACK AND ANOTHER ADDITIONAL FILLER

FIELD OF THE INVENTION

The invention relates to a tyre inner liner having a rubber composition comprising an elastomeric matrix based on butyl rubber and containing a low content of carbon black, and also a low total content of reinforcing and semi-reinforcing fillers.

The invention also relates to a tyre comprising such a liner.

RELATED ART

Tubeless tyres have an internal surface of low permeability to air in order to prevent deflation of the tyre and to protect the sensitive internal regions of the latter from admissions of oxygen and water, such as the plies comprising oxidation-sensitive metal cords, this protection making it possible to improve the endurance of the tyre. Today, such protection of the internal surface of the tyres is generally performed by inner liners consisting of elastomeric compositions based on butyl rubber. In point of fact, the performances in terms of impermeability to air of butyl rubbers are related to a not insignificant minimum thickness (of the order of a millimeter) and thus to a certain weight, which is not optimal.

Thus, it is necessary to add reinforcing fillers, such as carbon black, to the inner liner rubber composition in order to improve its impermeability. However, in large amounts, these reinforcing fillers are detrimental to certain properties of the composition in the cured state: degradation of the mechanical properties, in particular a decrease in flexural strength, and also of the rolling resistance properties.

In point of fact, since savings in fuel and the need to protect the environment have become a priority, it is desirable to produce inner liners which are impermeable to air and which exhibit a weight and a hysteresis which are as low as possible, in order to obtain an improved rolling resistance of the tyre.

The introduction of plasticizing agent of oil type makes it possible to overcome the mechanical property problems set out above, but is very highly disadvantageous to the impermeability.

There is therefore a constant need to decrease the hysteresis and the weight of the inner liners without affecting the other properties essential to these inner liners (impermeability and endurance).

Various solutions have been envisaged in order to overcome these disadvantages, in particular by resorting to other types of fillers which are additional to the reinforcing fillers, often known under the name of smectites, in particular of organophilic smectites. These organophilic smectites improve the impermeability properties of materials if they are well dispersed in the material. However, this dispersion is often difficult to obtain due to the low thermodynamic compatibility existing between the elastomers and such fillers. Publication WO 2006/047509 by the applicant describes a composition for a tyre inner liner of which the composition based on butyl rubber and comprising carbon black comprises non-reinforcing fillers consisting of organophilic smectites which reduce gas-permeability, dispersed in the elastomeric matrix, and also a specific plasticizing agent consisting of a terpene resin having in particular a glass transition temperature Tg above 50° C. This composition effectively exhibits mechanical and impermeability properties which make it acceptable for use as a tyre inner liner, by virtue of the combined effect of these organophilic smectites and of this high-Tg resin.

Other solutions consist in using lamellar fillers such as graphite in order to improve the impermeability of the composition. However, the presence of graphite can lead to mixture processability problems. Thus, application WO 2008/145314 describes a rubber composition for a tyre inner liner based on at least one butyl rubber, a reinforcing filler, graphite and a hydrocarbon-based plasticizing resin, which makes it possible to obtain an inner liner that also exhibits a good compromise between properties.

Moreover, if it was decided to lower the carbon black content in order to prevent the problems set out above, associated with a large amount of carbon black, this might be expected to be detrimental to the endurance of the tyre.

The applicant has nevertheless discovered, surprisingly and contrary to the knowledge of those skilled in the art, that there is a solution for obtaining an inner liner with a good compromise between properties and a low carbon black content. This solution consists in producing an inner liner which has a low amount of carbon black by adding an additional filler without however substantially increasing the total content of reinforcing or semi-reinforcing fillers in an elastomeric matrix predominantly consisting of butyl rubber.

In point of fact, those skilled in the art expect such a composition to be detrimental to the endurance properties of a tyre having an inner liner based on this composition.

However, the applicant has discovered that, on the contrary, such a composition makes it possible to obtain a tyre which exhibits good impermeability and good endurance while at the same time exhibiting reduced hysteresis.

BRIEF DESCRIPTION OF EMBODIMENTS OF THE INVENTION

A subject of the invention is thus a tyre inner liner having a rubber composition comprising:
  an elastomeric matrix comprising at least 50 phr of one or more butyl rubbers,
  from 5 to 35 phr of carbon black,
  from 0 to less than 10 phr of a plasticizing agent,
  at least 5 phr of one or more additional fillers selected from reinforcing fillers other than carbon black, semi-reinforcing fillers and inert fillers,
  the total content of reinforcing fillers and of semi-reinforcing fillers in the rubber composition varying from 5 to 50 phr.

Such an inner liner according to the invention has a lower hysteresis than an inner liner containing more carbon black.

Furthermore, it meets the requirements required for inner liners, namely good permeability.

Finally, the tyres manufactured from an inner liner according to the invention have good endurance.

A further subject of the invention is a tyre comprising an inner liner as defined above.

DETAILED DESCRIPTION

The invention and its advantages will be easily understood in the light of the description and the exemplary embodiments that follow.

In the present description, unless expressly indicated otherwise, all the percentages (%) shown are % by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

In the present application, the term "part per hundred parts of elastomer" or "phr" is intended to mean the part by weight of a constituent per 100 parts by weight of the elastomer(s), i.e. of the total weight of the elastomer(s). Thus, a constituent at 60 phr will mean, for example, 60 g of this constituent per 100 g of elastomer.

As is customary in the present application, the terms "elastomer" and "rubber", which are interchangeable, are used without distinction in the text.

Thus, a first subject of the invention is a tyre inner liner having a rubber composition comprising:
  an elastomeric matrix comprising at least 50 phr of one or more butyl rubbers,
  from 5 to 35 phr of carbon black,
  from 0 to less than 10 phr of a plasticizing agent,
  at least 5 phr of one or more additional fillers selected from reinforcing fillers other than carbon black, semi-reinforcing fillers and inert fillers,
  the total content of reinforcing fillers and of semi-reinforcing fillers in the rubber composition varying from 5 to 50 phr.

For the purposes of the present invention, the term "elastomeric matrix" is intended to mean all of the elastomers (or rubbers) of the rubber composition. Thus, the elastomeric matrix may in particular be constituted by a single elastomer, but also by a blend of two or more elastomers.

For the purposes of the present invention, the term "butyl rubber" is intended to mean an isobutylene homopolymer or an isobutylene/isoprene copolymer, and also the halogenated derivatives, in particular generally brominated or chlorinated derivatives, of these isobutylene homopolymers and isobutylene/isoprene copolymers.

Particularly preferably, the butyl rubber(s) that can be used in the inner liner according to the invention are selected from isobutylene rubbers, isobutylene/isoprene copolymers (IIR), bromobutyl rubbers such as the bromoisobutylene/isoprene copolymer (BIIR) and chlorobutyl rubbers such as the chloroisobutylene/isoprene copolymer (CIIR).

By extension of the preceding definition, the name "butyl rubber" will also include copolymers of isobutylene and of styrene derivatives, such as brominated isobutylene/methylstyrene copolymers (BIMSs), among which is included in particular the elastomer called Exxpro sold by Exxon.

The butyl rubber(s) that can be used in the inner liner of the present invention represent(s) at least 50 phr, i.e. it (they) represent(s) at least 50% by weight of the total weight of the elastomeric matrix.

As other elastomers present in the elastomeric matrix in addition to the butyl rubber(s), mention may be made in particular of diene elastomers other than the butyl elastomers mentioned above.

The term "diene" elastomer or rubber should be understood, in a known manner, as meaning one or more elastomers derived at least partly (i.e.; a homopolymer or a copolymer) from diene monomers (monomers bearing two conjugated or non-conjugated carbon-carbon double bonds).

These diene elastomers can be classified into two categories: "essentially unsaturated" or "essentially saturated".

"Essentially unsaturated" is generally intended to mean a diene elastomer resulting at least in part from conjugated diene monomers having a content of units of diene origin (conjugated dienes) which is greater than 15% (mol %). In the category of "essentially unsaturated" diene elastomers, a "highly unsaturated" diene elastomer is intended in particular to mean a diene elastomer having a content of units of diene origin (conjugated dienes) which is greater than 50%.

Thus, diene elastomers such as certain copolymers of dienes and of α-olefins of EPDM type may be described as "essentially saturated" diene elastomers (low or very low content of units of diene origin, always less than 15%).

Given these definitions, the term "diene elastomer", irrespective of the above category, that can be used in the elastomeric matrix of the inner liner in accordance with the invention, is more particularly intended to mean:
  (a)—any homopolymer obtained by polymerization of a conjugated diene monomer having from 4 to 12 carbon atoms;
  (b)—any copolymer obtained by copolymerization of one or more conjugated dienes with one another or with one or more vinylaromatic compounds having from 8 to 20 carbon atoms;
  (c)—a ternary copolymer obtained by copolymerization of ethylene and of an α-olefin containing from 3 to 6 carbon atoms with a non-conjugated diene monomer containing from 6 to 12 carbon atoms, for instance the elastomers obtained from ethylene and propylene with a non-conjugated diene monomer of the abovementioned type, in particular such as 1,4-hexadiene, ethylidenenorbornene or dicyclopentadiene.

The following are in particular suitable as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. As vinylaromatic compounds, styrene, ortho-, meta-, para-methyl styrene, the "vinyl-toluene" commercial mixture, para-tert-butyl styrene, methoxy styrenes, chloro styrenes, vinylmesitylene, divinylbenzene and vinylnaphthalene are suitable for use.

The diene copolymers mentioned previously (category (b)) may contain between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers may, for example, be block, random, sequential or microsequential elastomers and may be prepared in dispersion or in solution; they may be coupled and/or star-branched or else functionalized with a coupling and/or star-branching or functionalization agent.

The following are suitable for use: polybutadienes and in particular those having a content (mol %) of 1,2-units of between 4% and 80% or those having a content (mol %) of cis-1,4-units of greater than 80%, polyisoprenes, butadiene/styrene copolymers and in particular those having a styrene content of between 5% and 50% by weight and more particularly between 20% and 40%, a content (mol %) of 1,2-bonds of the butadiene part of between 4% and 65% and a content (mol %) of trans-1,4-bonds of between 20% and 80%, butadiene/isoprene copolymers and in particular those having an isoprene content of between 5% and 90% by weight and a glass transition temperature (Tg, measured according to ASTM D3418) of −40° C. to −80° C., or isoprene/styrene copolymers and in particular those having a styrene content of between 5% and 50% by weight and a Tg of between −25° C. and −50° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −20° C. and −70° C., are in particular suitable for use.

As other elastomers present in the elastomeric matrix in addition to the butyl rubber(s), mention may also be made of isoprene elastomers other than the butyl elastomers mentioned above.

The term "isoprene elastomer" is intended to mean, in a known manner, an isoprene homopolymer or copolymer, in other words a diene elastomer selected from the group consisting of natural rubber (NR), synthetic polyisoprenes (IRs), various isoprene copolymers and the mixtures of these elastomers. Among the isoprene copolymers, mention will be made in particular of isoprene/styrene (SIR), isoprene/butadiene (BIR) or isoprene/butadiene/styrene (SBIR) copolymers. This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, even more preferentially greater than 98%.

Preferably, in the present invention, the butyl rubber(s) has (have) a content varying from 70 to 100 phr, preferably varying from 90 to 100 phr.

In a first particular mode of the invention, the elastomeric matrix comprises a blend of several butyl rubbers.

In a second particular mode of the invention, the elastomeric matrix consists of one or more butyl rubbers.

In this second particular mode, it is of course understood that the content of the butyl rubber alone or of the blend of several butyl rubbers is then 100 phr.

In the case of a low level of the sum of the reinforcing filler(s) and of the semi-reinforcing filler(s), and in particular of a very low level of the reinforcing filler(s), those skilled in the art will know how to adjust the molecular weight of the butyl(s) in order to obtain a satisfactory processability in the cured state.

As previously seen, the total content of reinforcing fillers and of semi-reinforcing fillers in the rubber composition that can be used in the inner liner according to the invention varies from 5 to 50 phr.

For the purposes of the present invention, the term "reinforcing fillers" is intended to mean any type of fillers known for their capacity to reinforce a rubber composition that can be used for the manufacture of tyres, for example an organic filler such as carbon black or alternatively a reinforcing inorganic filler.

Thus, in the present invention, the rubber composition that can be used in the inner liner according to the invention comprises from 5 to 35 phr of carbon black.

All carbon blacks, in particular blacks of the HAF, ISAF or SAF type, conventionally used in tyres ("tyre-grade" blacks) are suitable as carbon blacks. Among the latter, mention will more particularly be made of the reinforcing carbon blacks of the 100, 200 or 300 series (ASTI grades), such as, for example, the N115, N134, N234, N326, N330, N339, N347 or N375 blacks, or else, depending on the applications targeted, the blacks of higher series (for example N660, N683 or N772), or even N990.

Needless to say, it is possible to use just one carbon black or a blend of several carbon blacks of different ASTM grades.

Preferably, in the present invention, the content of carbon black in the rubber composition varies from 15 to 30 phr, preferably varies from 20 to 30 phr.

As previously seen, the rubber composition that can be used in the inner liner according to the invention comprises at least 5 phr of one or more additional fillers selected from reinforcing fillers other than carbon black, semi-reinforcing fillers and inert fillers.

Thus, the rubber composition that can be used in the present invention may also comprise one or more reinforcing inorganic fillers.

In the present patent application, the term "reinforcing inorganic filler" should be understood, by definition, as meaning any inorganic or mineral filler, irrespective of its colour and its origin (natural or synthetic), also known as "white filler", "clear filler" or even "non-black filler", in contrast to carbon black, which is capable of reinforcing by itself alone, without any means other than an intermediate coupling agent, a rubber composition intended for the manufacture of tyres, in other words which is capable of replacing, in its reinforcing role, a conventional tyre-grade carbon black; such a filler is generally characterized, in a known manner, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_7O_3$), are in particular suitable as reinforcing inorganic fillers. The silica used may be any reinforcing silica known to those skilled in the art, in particular any precipitated or fumed silica having a BET specific surface area and a CTAB specific surface area which are both less than 450 $m^2/g$, preferably from 30 to 400 $m^2/g$.

As highly dispersible precipitated silicas (known as "HDSs"), examples that will be mentioned include the Ultrasil 7000 and Ultrasil 7005 silicas from the company Degussa, the Zeosil 1165MP, 1135MP and 1115MP silicas from the company Rhodia, the Hi-Sil EZ150G silica from the company PPG, the Zeopol 8715, 8745 and 8755 silicas from the company Huber or the silicas with a high specific surface area as described in patent application WO 03/016387.

Finally, those skilled in the art will understand that, as filler equivalent to the reinforcing inorganic filler described in the present section, use might be made of a reinforcing filler of another nature, in particular organic nature, provided that this reinforcing filler is covered with an inorganic layer, such as silica, or else comprises functional sites, in particular hydroxyl sites, at its surface which require the use of a coupling agent in order to form the bond between the filler and the elastomer.

It is recalled here that the term "coupling agent" is intended to mean, in a known manner, an agent that is capable of establishing a sufficient bond, of physical and/or chemical nature, between the inorganic filler and the elastomer.

Such coupling agents, in particular silica/elastomer coupling agents, have been described in a very large number of documents, the most well-known being bifunctional organosilanes bearing alkoxy functions (i.e., by definition, "alkoxysilanes") and functions that are capable of reacting with the elastomer, for instance polysulphide functions.

As previously seen, the additional filler(s) present in the rubber composition that can be used according to the invention may be selected from semi-reinforcing fillers.

Semi-reinforcing fillers are not capable by themselves of reinforcing a rubber composition intended for the manufacture of tyres, in other words they are not suitable for replacing, in its reinforcement role, a conventional tyregrade carbon black, but they allow an increase in the tensile modulus of a rubber composition into which they are incorporated, which is why they are referred to as being "semi-reinforcing".

Preferably, the content of the semi-reinforcing filler(s) in the rubber composition that can be used according to the invention varies from 0 to less than 35 phr, preferably from 1 to less than 35 phr, and even more preferentially from 1 to 20 phr.

As semi-reinforcing filler that may be present for the purposes of the present invention, mention may be made in particular of graphite.

The term "graphite" is intended to mean, generally, an assembly of non-compact hexagonal sheets of carbon atoms: graphenes. Graphite, a hexagonal crystalline system, has a stack of ABAB type in which the B plane is translated relative to the A plane; it belongs to the crystalline group: P63/mmc space group.

Graphite cannot be regarded as a reinforcing filler, contrary to carbon black or to silica, insofar as it makes possible an increase in the tensile modulus of a rubber composition into which it is incorporated.

Given these definitions, the graphite that is capable of being used according to the invention is more particularly understood as being:
  (a) any natural graphite, associated with rocks affected by metamorphism, after the separation of the impurities accompanying the graphite veins and after milling;
  (b) any thermally expandable natural graphite, i.e. in which a chemical compound in the liquid state, for example an acid, is intercalated between its graphene planes;
  (c) any expanded natural graphite, the latter being produced in two steps: intercalation of a chemical compound in the liquid state, for example an acid, between the graphene planes of a natural graphite by chemical treatment, and high-temperature expansion;
  (d) any synthetic graphite obtained by graphitization of petroleum coke.

The rubber composition that can be used according to the invention may contain a single graphite or a mixture of several graphites; thus, there may be a blend of natural graphite and/or of expanded graphite and/or of synthetic graphite.

The graphite as defined above can be provided morphologically in a lamellar or nonlamellar form.

Preferably, the graphite that can be used according to the invention is in lamellar form.

As seen previously, the additional filler(s) may be selected from inert fillers.

Preferably, the content of the inert filler(s) in the rubber composition that can be used according to the invention varies from 0 to less than 70 phr.

Particularly preferably, the content of the inert filler(s) in the rubber composition that can be used according to the invention varies from 1 to 60 phr, preferably from 1 to 45 phr.

When the content of the inert filler(s) in the rubber composition that can be used according to the invention varies from 1 to 60 phr, preferably from 1 to 45 phr, then, in one particular mode of the invention, the content of carbon black in the rubber composition that can be used according to the invention varies from 5 to 15 phr.

The inert filler(s) that can be used according to the invention may be selected from chalk, clay, bentonite, talc, kaolin, glass microbeads, glass flakes, and a mixture of these compounds.

Preferably, the inert filler that can be used according to the invention is chalk.

The chalk is preferentially in the form of microparticles, the mean size (by weight) of which is greater than 1 µm. The median size of the chalk microparticles, which is a measurement obtained on a sedigraph, is preferentially between 0.5 and 200 µm, more particularly between 0.5 and 30 µm and even more preferentially between 1 and 20 µm.

The chalks known to those skilled in the art are natural calcium carbonates (chalk) or synthetic calcium carbonates with or without coating (for example with stearic acid).

By way of examples of such preferential and commercially available chalks, mention may for example be made of the chalk sold under the name "Omya BLS" by the company Omya.

As previously explained, the total content of reinforcing fillers and of semi-reinforcing filler in the rubber composition that can be used in the inner liner according to the invention varies from 5 to 50 phr. More specifically, this means that the sum of the contents of carbon black and of optional other reinforcing fillers, for example silica, and of the contents of the various optional semi-reinforcing fillers, for example graphite, is greater than or equal to 5 and is less than or equal to 50 phr.

In the present invention, the carbon black may advantageously constitute the sole reinforcing filler or the predominant reinforcing filler.

As a reminder, in the present invention, the rubber composition that can be used in the inner liner comprises from 0 to less than 10 phr of a plasticizing agent.

In a manner known to those skilled in the art, a "plasticizing agent" by definition is a compound that is liquid or solid at ambient temperature (23° C.) and at atmospheric pressure ($1.013 \times 10^5$ Pa), which is compatible, i.e. miscible in the proportion used, with the rubber composition for which it is intended, so as to act as a true diluent.

Preferably, in the present invention, the plasticizing agent is selected from plasticizing oils and plasticizing resins.

By definition, a plasticizing oil (also known as a liquid plasticizing agent) is liquid at ambient temperature and atmospheric pressure.

This or these plasticizing oils generally have a low glass transition temperature of less than −20° C. (Tg measured according to ASTM D3418), preferably less than −40° C.

The glass transition temperatures are measured in a known manner by DSC (Differential Scanning calorimetry) according to Standard ASTM D3418.

As plasticizing oil that can be used in the inner liner according to the invention, use may be made of any "extender" oils, whether they are of aromatic or non-aromatic nature, known for their plasticizing properties towards the elastomers used in the present invention.

Plasticizing oils selected from the group consisting of liquid diene polymers, polyolefin oils, naphthenic oils, paraffinic oils, DAE (Distillate Aromatic Extracts) oils, MES (Medium Extracted Solvates) oils, TDAE (Treated Distillate Aromatic Extracts) oils, RAE (Residual Aromatic Extracts) oils, TRAE (Treated Residual Aromatic Extracts) oils, SRAE (Safety Residual Aromatic Extracts) oils, mineral oils, vegetable oils, ether plasticizing agents, ester plasticizing agents, phosphate plasticizing agents, sulphonate plasticizing agents and mixtures of these compounds are particularly suitable for use.

The liquid polymers resulting from the polymerization of olefins or dienes, such as, for example, those selected from the group consisting of polybutenes, polydienes, in particular polybutadienes, polyisoprenes, copolymers of butadiene and isoprene, copolymers of butadiene or isoprene and styrene, and mixtures of these liquid polymers, are also suitable. The number-average molar mass of such liquid polymers is preferentially within a range extending from 500 g/mol to 50 000 g/mol, more preferentially from 1000 g/mol to 10 000 g/mol. Mention may in particular be made, by way of example, of the Ricon products from Sartomer.

Functionalized or non-functionalized polyisobutylene oils with a molecular mass of between 200 g/mol and 40 000 g/mol are also suitable for use.

According to another preferential embodiment of the invention, the plasticizing oil(s) are vegetable oils (such as linseed oil, safflower oil, soybean oil, corn oil, cottonseed oil, rape oil, castor oil, tung oil, pine oil, sunflower oil, palm oil, olive oil, coconut oil, groundnut oil, grapeseed oil, and mixtures of these oils, in particular a sunflower oil).

According to another particular embodiment of the invention, the plasticizing oil(s) is (are) an ether, for instance polyethylene glycols or polypropylene glycols.

Plasticizing oils selected from the group constituted by ester plasticizing agents, phosphate plasticizing agents, sulphonate plasticizing agents and mixtures of these compounds are also suitable for use.

As a reminder, the plasticizing agent may also be selected from plasticizing resins.

In contrast with plasticizing oils, the term "plasticizing resin" is intended to mean a compound which is solid at ambient temperature (23° C.) and at atmospheric pressure ($1.013 \times 10^5$ Pa).

This or these plasticizing resins generally have a glass transition temperature of greater than 20° C. (Tg measured according to ASTM D3418), preferably greater than 30° C.

Preferably, the plasticizing resins that can be used according to the invention are hydrocarbon-based plasticizing resins.

Hydrocarbon-based resins are polymers that are well known to those skilled in the art, which are thus miscible by nature in elastomer compositions, when they are additionally classed as "plasticizing".

These hydrocarbon-based plasticizing resins generally have a glass transition temperature of greater than 20° C. and a softening point of less than 170° C.

The softening points are measured according to Standard ASTM E-28.

They have been widely described, for example, in the book entitled "Hydrocarbon Resins" by R. Mildenberg, M. Zander and G. Collin (New York, V C H, 1997, ISBN 3-527-28617-9), Chapter 5 of which is devoted to their applications, in particular in the tyre rubber field (5.5. "Rubber Tires and Mechanical Goods").

They may be aliphatic, naphthenic or aromatic or else of the aliphatic/naphthenic/aromatic type, i.e. based on aliphatic and/or naphthenic and/or aromatic monomers. They may be natural or synthetic and may or may not be based on petroleum (if this is the case, they are also known under the name of petroleum resins). They are preferably exclusively hydrocarbon-based, that is to say that they comprise only carbon and hydrogen atoms.

The plasticizing agent content in the rubber composition that can be used according to the invention varies from 0 to less than 10 phr.

Preferably, the plasticizing agent content in the rubber composition is less than or equal to 6 phr.

The rubber composition that can be used in the inner liner according to the invention may also comprise all or a portion of the usual additives usually used in elastomer compositions intended for the manufacture of tyres, for instance protective agents such as chemical antiozonants, antioxidants, anti-fatigue agents, methylene acceptors (for example phenolic novolac resin) or methylene donors (for example HMT or H3M), a crosslinking system based either on sulphur, or on sulphur donors and/or on peroxide and/or on bismaleimides and/or vulcanizing resins, vulcanization accelerators or vulcanization activators.

The rubber composition that can be used in the inner liner according to the invention may be manufactured in appropriate mixers, using two successive phases of preparation well known to those skilled in the art: a first phase of thermomechanical working or kneading ("non-productive" phase) at high temperature, up to a maximum temperature of between 110° C. and 140° C., preferably between 110° C. and 135° C., followed by a second phase of mechanical working ("productive" phase) up to a lower temperature, typically below 110° C., for example between 40° C. and 100° C., and finally a finishing phase during which the crosslinking system is incorporated.

The process for preparing such a composition comprises, for example, the following steps:
  thermomechanically kneading (for example one or more times) the elastomeric matrix with the carbon black, the additional filler(s) and the plasticizing system if it is present, until a maximum temperature of between 110° C. and 140° C. (phase termed "non-productive") is reached;
  cooling the combined mixture to a temperature of less than 100° C.;
  subsequently incorporating, during a ("productive") second step, a crosslinking system;
  kneading the whole mixture up to a maximum temperature of less than 110° C.

By way of example, the non-productive phase is carried out in a single thermomechanical step during which, in a first step, all the base constituents (the butyl rubber(s), the optional other elastomer(s), the optional plasticizing system, the carbon black and the additional filler(s)) are introduced into an appropriate mixer, such as a standard internal mixer, followed, in a second step, for example after kneading for one to two minutes, by the optional other additives, additional agents for covering the filler or additional processing aids, with the exception of the crosslinking system. The total kneading time, in this non-productive phase, is preferably between 1 and 15 min.

After cooling the mixture thus obtained, the crosslinking system is then incorporated in an external mixer, such as an open mill, maintained at a low temperature (for example between 40° C. and 100° C.). The combined mixture is then mixed (productive phase) for a few minutes, for example between 2 and 15 min.

The crosslinking system per se is preferably based on sulphur and on a primary vulcanization accelerator, in particular on an accelerator of the sulphenamide type. Various known secondary vulcanization accelerators or vulcanization activators, such as zinc oxide, stearic acid, guanidine derivatives (in particular diphenylguanidine), and the like, come to be added to this vulcanization system, being incorporated during the first non-productive phase and/or during the productive phase. The sulphur content is preferably between 0.5 and 3.0 phr and the content of the primary accelerator is preferably between 0.5 and 5.0 phr.

Use may be made, as (primary or secondary) accelerator, of any compound capable of acting as accelerator of the vulcanization of the elastomers according to the invention in the presence of sulphur, in particular accelerators of the thiazole type and their derivatives and accelerators of the thiuram and zinc dithiocarbamate types. These accelerators are more preferably selected from the group consisting of 2-mercaptobenzothiazyldisulphide (abbreviated to "MBTS"), N-cyclohexyl-2-benzothiazylsulphenamide (abbreviated to "CBS"), N,N-dicyclohexyl-2-benzothiazylsulphenamide (abbreviated to "DCBS"), N-(tert-butyl)-2-benzothiazylsulphenamide (abbreviated to "TBBS"), N-(tert-butyl)-2-benzothiazylsulphenimide (abbreviated to "TB SI"), zinc dibenzyldithiocarbamate (abbreviated to "ZBEC") and the mixtures of these compounds.

Preferably, use is made of a primary accelerator of the sulphenamide type.

The final composition thus obtained may then be calendered, for example in the form of a sheet or of a plaque, in particular for laboratory characterization, or also extruded, for example in order to form a rubber profiled element used for the manufacture of an inner liner.

The inner liner can be used in any type of tyre article. Examples of such tyre articles that may be mentioned include pneumatic boats, and balls used for games or sports.

Consequently, the invention also relates to a tyre comprising an inner liner as defined previously.

In general, the tyre according to the invention is intended to equip motor vehicles of private passenger type, SUVs (sport utility vehicles), two-wheeled vehicles (in particular motorbikes), aeroplanes, and also industrial vehicles such as vans, heavy-goods vehicles and other transportation or material-handling vehicles.

The invention and its advantages will be more easily understood in the light of the exemplary embodiments that follow.

EXAMPLES

I Measuring Methods and Tests:
1) Properties after Curing: Tensile Tests
These tests make it possible to determine the elasticity stresses and the properties at break.

Unless otherwise indicated, they are carried out in accordance with French Standard NF T 46-002 of September 1988. The breaking stresses (in MPa) and the elongations at break (in %) are measured, at a temperature of 23° C.

2) Properties after Curing: Dynamic Properties
The dynamic property $\tan(\delta)$max is measured on a viscosity analyser (Metravib VA4000) according to Standard ASTM D 5992-96. The response of a sample of vulcanized composition (cylindrical test specimen with a thickness of 2 mm and a cross section of 79 mm$^2$), subjected to a simple alternating sinusoidal shear stress, at a frequency of 10 Hz and at a temperature of 23° C. according to Standard ASTM D 1349-99, is recorded. A strain amplitude sweep is carried out from 0.1% to 50% peak-to-peak (outward cycle) and then from 50% to 0.1% peak-to-peak (return cycle). The result made use of is the loss factor $\tan(\delta)$. For the return cycle, the maximum value of $\tan(\delta)$ observed, denoted $\tan(\delta)$max, is indicated. This value is representative of the hysteresis of the material and in the present case of the rolling resistance: the smaller the value of $\tan(\delta)$max, the lower the rolling resistance.

3) Properties after Curing: Permeability
The permeability values are measured using a Mocon Oxtran 2/60 permeability "tester" at 40° C. Cured samples in the form of discs with a predetermined thickness (approximately 0.8 to 1 mm) are fitted to the device and rendered leaktight with vacuum grease. One of the faces of the disc is kept under 10 psi of nitrogen while the other face is kept under 10 psi of oxygen. The increase in the concentration of oxygen is monitored using a "Coulox" oxygen detector on the face kept under nitrogen. The concentration of oxygen on the face kept under nitrogen which makes it possible to achieve a constant value, used to determine the permeability to oxygen, is recorded.

An arbitrary value of 100 is given for the permeability to oxygen of the control, a result of less than 100 indicating a reduction in the permeability to oxygen and thus a better impermeability.

4) Tests on Tyres
4.1) Rolling Resistance
The rolling resistance is measured on a flywheel, according to the ISO 7-67 (1992) method. In Table 3, the rolling resistance indicated corresponds to the difference between the rolling resistance of the reference tyre and the rolling resistance of the tyre according to the invention.

4.2) Endurance
The very long-duration rolling endurance (40 000 km) under very severe conditions was tested, on an automatic rolling machine, according to various predetermined cycles of pressure, load and speed, after which the general condition of each tyre is observed.

4.3) Pressure Loss
Measurement tests were conducted in order to evaluate the pressure loss of tyres after 4 weeks at 20° C.

Pneumatic tyres in accordance with the invention, of the type for a passenger vehicle (size 205/55 R16), were manufactured, their internal wall being covered with an airtight layer of a constant given thickness (put in place on a building drum, before manufacture of the rest of the tyre). The tyres were then vulcanized. These pneumatic tyres in accordance with the invention were compared with control pneumatic tyres (Michelin brand-name Energy™ Saver) comprising a conventional airtight layer, of the same thickness, based on butyl rubber. The airtightness of the two types of tyres was measured by measuring the pressure loss at 20° C. after 4 weeks. The results presented below are presented in base 100: an arbitrary value of 100 is given for the airtightness performance of the control, a result greater than 100 indicating a better airtightness performance and therefore a decrease in pressure loss after 4 weeks.

II Preparation and Tests of the Rubber Compositions
The following tests are carried out in the following way: the butyl rubber(s), the elastomer(s) if they are present, the fillers and the plasticizing agent if it is present in the rubber composition, and also the various other ingredients with the exception of the vulcanization system, are successively introduced into an internal mixer (final degree of filling:

approximately 70% by volume), the initial vessel temperature of which is approximately 60° C. Thermomechanical working (non-productive phase) is then carried out in one step, which lasts in total approximately from 3 to 4 min, until a maximum "dropping" temperature of 140° C. is reached.

The mixture thus obtained is recovered and cooled and then sulphur, an accelerator of sulphenamide type and the other elements of the vulcanization system are incorporated on a mixer (homofinisher) at 30° C., everything being mixed (productive phase) for an appropriate time (for example between 5 and 12 min).

The compositions thus obtained are subsequently calendered, either in the form of plaques (thickness from 2 to 3 mm) or thin sheets of rubber, for the measurement of their physical or mechanical properties, or extruded in the form of tyre inner liners.

Example 1: Rubber Composition Comprising an Inert Filler and a Plasticizing Oil

Table I below collates the ingredients and the contents (expressed in phr) of a comparative composition (T1) and of three compositions that can be used according to the invention (C1 to C3).

TABLE I

|  | T1 | C1 | C2 | C3 |
|---|---|---|---|---|
| Butyl rubber[1] | 90 | 90 | 90 | 90 |
| Synthetic polyisoprene[2] | 10 | 10 | 10 | 10 |
| Carbon black[3] | 50 | 25 | 25 | 5 |
| Natural graphite | — | — | 15 | — |
| Natural chalk | 20 | 20 | 20 | 40 |
| Plasticizing agent[4] | 3 | 3 | 3 | 3 |
| Sulphur | 1.5 | 1.5 | 1.5 | 1.5 |
| MBTS[5] | 1.2 | 1.2 | 1.2 | 1.2 |
| ZnO | 1.5 | 1.5 | 1.5 | 1.5 |
| Stearic acid | 1.5 | 1.5 | 1.5 | 1.5 |

[1]Brominated polyisobutylene sold by the company Exxon Chemical Co.
[2]Synthetic polyisoprene containing 97% of cis-1,4 structures, sold by the company Nizhnekamsk under the reference IR6596
[3]N772
[4]TDAE oil
[5]2-Mercaptobenzothiazyl disulphide Composition T1 is a conventional control composition used in tyre inner liners, which comprises 50 phr of carbon black and 20 phr of chalk.

Composition C1 is in accordance with the invention, and comprises 25 phr of carbon black and 20 phr of chalk.

Composition C2 is in accordance with the invention, and comprises 25 phr of carbon black, 20 phr of chalk and 15 phr of graphite.

Composition C3 is in accordance with the invention, and comprises 5 phr of carbon black and 40 phr of chalk.

The properties of compositions T1 and C1 to C3 after curing have been summarized in Table II below.

TABLE II

|  | T1 | C1 | C2 | C3 |
|---|---|---|---|---|
| Breaking stress (in Mpa) | 9.3 | 11.5 | 8.1 | 7.3 |
| Elongation at break (in %) | 630 | 835 | 735 | 875 |
| Tan(δ)max (at 23° C.) | 0.37 | 0.34 | 0.34 | 0.33 |
| Permeability to oxygen | 100 | 101 | 75 | 100 |

After curing, it is noted that the elongation at break and breaking stress properties of compositions C1 to C3 in accordance with the invention are overall equivalent to those of control composition T1.

Furthermore, compositions C1 to C3 in accordance with the invention exhibit lower hysteresis than control composition T1 (tan(δ)max).

Finally, compositions C1 and C3 in accordance with the invention exhibit a permeability to oxygen that is equivalent to that of control composition T1. It is even noted that composition C2 in accordance with the invention has a lower permeability (and therefore a better impermeability) to oxygen than that of control composition T1.

Example 2: Rubber Composition Comprising an Inert Filler and a Plasticizing Resin Table III below collates the ingredients and the contents (expressed in phr) of a comparative composition (T2) and of a composition that can be used according to the invention (C4).

TABLE III

|  | T2 | C4 |
|---|---|---|
| Butyl rubber[1] | 100 | 100 |
| Carbon black[2] | 50 | 25 |
| Natural graphite | 10 | 10 |
| Plasticizing agent[3] | 8 | 8 |
| Sulphur | 1.5 | 1.5 |
| MBTS[4] | 1.2 | 1.2 |
| ZnO | 1.5 | 1.5 |
| Stearic acid | 1.5 | 1.5 |

[1]Brominated polyisobutylene sold by the company Exxon Chemical Co.
[2]N772
[3]Plasticizing resin: C5 fraction/C9 fraction resin sold by the company Cray Valley under the name THER 8644 resin (Tg = 44° C.)
[4]2-Mercaptobenzothiazyl disulphide Composition T2 is a conventional control composition used in tyre inner liners, which comprises 50 phr of carbon black, 10 phr of graphite and 8 phr of plasticizing resin.

Composition C4 is in accordance with the invention, and comprises 25 phr of carbon black, 10 phr of graphite and 8 phr of plasticizing resin.

The properties of compositions T2 and C4 after curing have been summarized in Table IV below.

TABLE IV

|  | T2 | C4 |
|---|---|---|
| Breaking stress (in Mpa) | 9.4 | 9.2 |
| Elongation at break (in %) | 725 | 840 |
| Tan(δ)max (at 23° C.) | 0.51 | 0.49 |
| Permeability to oxygen | 100 | 100 |

After curing, it is noted that the elongation at break and breaking stress properties of composition C4 in accordance with the invention are overall equivalent to those of control composition T2.

Furthermore, composition C4 in accordance with the invention exhibits lower hysteresis than control composition T2 (tan(δ)max).

Finally, composition C4 in accordance with the invention exhibits a permeability to oxygen that is equivalent to that of control composition T2.

Example 3: Rubber Composition Comprising Neither Inert Filler, Nor Plasticizing Agent Table V below collates the ingredients and the contents (expressed in phr) of a comparative composition (T3) and of a composition that can be used according to the invention (C5).

TABLE V

|  | T3 | C5 |
|---|---|---|
| Butyl rubber[(1)] | 100 | 100 |
| Carbon black[(2)] | 50 | 25 |
| Natural graphite | 10 | 10 |
| Sulphur | 1.5 | 1.5 |
| MBTS[(3)] | 1.2 | 1.2 |
| ZnO | 1.5 | 1.5 |
| Stearic acid | 1.5 | 1.5 |

[(1)]Brominated polyisobutylene sold by the company Exxon Chemical Co.
[(2)]N772
[(3)]2-Mercaptobenzothiazyl disulphide Composition T3 is a conventional control composition used in tyre inner liners, which comprises 50 phr of carbon black and 10 phr of graphite.

Composition C5 is in accordance with the invention, and comprises 25 phr of carbon black and 10 phr of graphite.

The properties of compositions T3 and C5 after curing have been summarized in Table VI below.

TABLE VI

|  | T3 | C5 |
|---|---|---|
| Breaking stress (in Mpa) | 9.3 | 9.5 |
| Elongation at break (in %) | 635 | 780 |
| Tan($\delta$)max (at 23° C.) | 0.40 | 0.37 |
| Permeability to oxygen | 100 | 101 |

After curing, it is noted that the elongation at break and breaking stress properties of composition C5 in accordance with the invention are overall equivalent to those of control composition T3.

Furthermore, composition C5 in accordance with the invention exhibits lower hysteresis than control composition T3 (tan($\delta$)max).

Finally, composition C5 in accordance with the invention exhibits a permeability to oxygen that is equivalent to that of control composition T3.

III Running Tests on the Tyres

Table VII below collates the ingredients and the contents (expressed in phr) of a comparative composition (T4). The summary of the ingredients and of the contents of composition C2 that can be used according to the invention is given by way of indication.

TABLE VII

|  | T4 | C2 |
|---|---|---|
| Butyl rubber[(1)] | 90 | 90 |
| Synthetic polyisoprene[(2)] | 10 | 10 |
| Carbon black[(3)] | 50 | 25 |
| Natural graphite | 15 | 15 |
| Natural chalk | 20 | 20 |
| Plasticizing oil[(4)] | 3 | 3 |
| Plasticizing resin[(5)] | 8 | — |
| Sulphur | 1.5 | 1.5 |
| MBTS[(6)] | 1.2 | 1.2 |
| ZnO | 1.5 | 1.5 |
| Stearic acid | 1.5 | 1.5 |

[(1)]Brominated polyisobutylene sold by the company Exxon Chemical Co.
[(2)]Synthetic polyisoprene containing 97% of cis-1,4 structures, sold by the company Nizhnekamsk under the reference IR6596
[(3)]N772
[(4)]TDAE oil
[(5)]Plasticizing resin: C5 fraction/C9 fraction resin sold by the company Cray Valley under the name THER 8644 resin (Tg = 44° C.)
[(6)]2-Mercaptobenzothiazyl disulphide Compositions T4 and C2 above were tested as an inner liner of radial-carcass passenger-vehicle tyres, of size 205/55 R16 (speed index H). They were prepared as described in detail above and calendered in the form of tyre inner liners at a thickness of 0.7 mm.

The rolling resistance, endurance and pressure loss tests are reported in Table VIII.

TABLE VIII

|  | T4 | C2 |
|---|---|---|
| Rolling resistance | — | gain of 0.12 kg/T |
| Endurance 40 000 km | ok | ok |
| Pressure loss | 100 | 100 |

These results show that, for an identical airtightness, the tyre having composition C2 in accordance with the invention as inner liner exhibits an improved rolling resistance compared with the tyre corresponding to control composition T4.

The endurance test at 40 000 km for the two tyres proved to be positive, i.e. the two tyres are capable of running for 40 000 km without showing any notable deterioration.

It will be noted that this validation of the endurance criteria is all the more noteworthy for the tyre comprising an inner liner of composition C2 in accordance with the invention, for which the corresponding composition contains more than two times less carbon black than control composition T4.

Finally, it is noted that the pressure loss of the tyre formed from the inner liner C2 is equivalent to the pressure loss of the tyre formed from the inner liner T4.

The invention claimed is:

1. A tire inner liner comprising a rubber composition comprising:
    an elastomeric matrix comprising at least 50 phr of one or more butyl rubbers;
    from 5 to 35 phr of carbon black;
    from 0 to less than 10 phr of a plasticizing agent; and
    at least 5 phr of one or more additional fillers selected from the group consisting of reinforcing fillers other than carbon black, semi-reinforcing fillers and inert fillers, the total content of reinforcing and semi-reinforcing fillers being from 5 to 50 phr,
    wherein the inert fillers are at a content of from 1 to 60 phr.

2. The tire inner liner according to claim 1, wherein the one or more butyl rubbers are selected from the group consisting of isobutylene rubbers, isobutylene/isoprene copolymers, bromobutyl rubbers and chlorobutyl rubbers.

3. The tire inner liner according to claim 1, wherein the content of the one or more butyl rubbers varies from 70 to 100 phr.

4. The tire inner liner according to claim 3, wherein the content of the one or more butyl rubbers varies from 90 to 100 phr.

5. The inner liner according to claim 1, wherein the elastomeric matrix comprises a blend of several butyl rubbers.

6. The inner liner according to claim 1, wherein the elastomeric matrix consists of one or more butyl rubbers.

7. The inner liner according to claim 1, wherein the content of carbon black varies from 15 to 30 phr.

8. The inner liner according to claim 7, wherein the content of carbon black varies from 20 to 30 phr.

9. The inner liner according to claim 1, wherein the one or more additional fillers comprise semi-reinforcing fillers at a content of from 0 to less than 35 phr.

10. The inner liner according to claim 9, wherein the semi-reinforcing fillers are at a content of from 1 to less than 35 phr.

11. The inner liner according to claim 10, wherein the semi-reinforcing fillers are at a content of from 1 to 20 phr.

12. The inner liner according to claim 9, wherein the semi-reinforcing fillers is graphite.

13. The inner liner according to claim 12, wherein the graphite is in lamellar form.

14. The inner liner according to claim 1, wherein the inert fillers are at a content of from 1 to 45 phr.

15. The inner liner according to claim 14, wherein the content of carbon black in the rubber composition is from 5 to 15 phr.

16. The inner liner according to claim 1, wherein the inert fillers is chalk.

17. The inner liner according to claim 1, wherein the plasticizing agent is selected from the group consisting of plasticizing oils and plasticizing resins.

18. The inner liner according to claim 1, wherein the content of plasticizing agent is less than or equal to 6 phr.

19. A tire comprising an inner liner according to claim 1.

20. A tire inner liner comprising a rubber composition comprising:
   an elastomeric matrix comprising at least 50 phr of one or more butyl rubbers;
   from 5 to 35 phr of carbon black;
   from 0 to less than 10 phr of a plasticizing agent; and
   at least 5 phr of one or more additional fillers selected from semi-reinforcing fillers and inert fillers, the total content of reinforcing fillers and semi-reinforcing fillers being from 5 to 50 phr,
   wherein carbon black is the sole reinforcing filler, and wherein the inert fillers are at a content of from 1 to 60 phr.

21. A tire comprising an inner liner according to claim 20.

* * * * *